No. 651,328. Patented June 5, 1900.
R. GUILMETTE.
CENTER SCRATCH GAGE.
(Application filed Apr. 5, 1900.)
(No Model.)

WITNESSES:
Harry J. Garceau
Andrew J. Pitten

INVENTOR:
Renaldo Guilmette
BY S. Scholfield ATTY.

UNITED STATES PATENT OFFICE.

RENALDO GUILMETTE, OF CENTRAL FALLS, RHODE ISLAND.

CENTER SCRATCH-GAGE.

SPECIFICATION forming part of Letters Patent No. 651,328, dated June 5, 1900.

Application filed April 5, 1900. Serial No. 11,777. (No model.)

*To all whom it may concern:*

Be it known that I, RENALDO GUILMETTE, a subject of the Queen of Great Britain, and a resident of Central Falls, in the county of Providence and State of Rhode Island, have invented a new and useful Improvement in Center Scratch-Gages, of which the following is a specification.

The nature of my invention consists in the employment of a differential screw having the finer screw-thread cut upon the coarser, whereby upon turning the screw the scratching-spur will be caused to move in either direction with one-half of the velocity of that of the movable guide of the gage.

Figure 1:
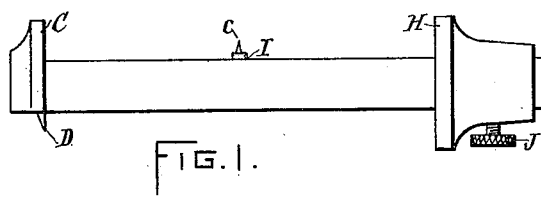
Figure 2:
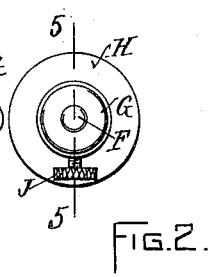
Figure 4:
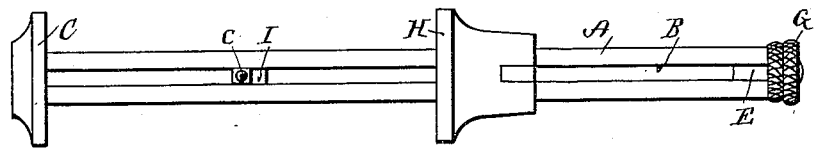
Figure 3:
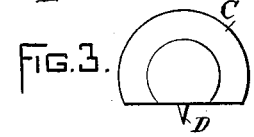
Figure 5:
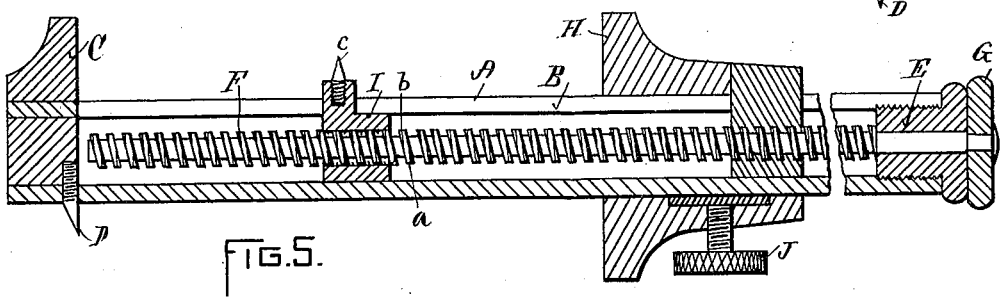
Figure 6:
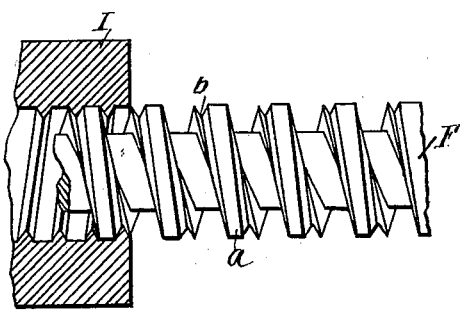

In the accompanying drawings, Figure 1 represents a side view of a center scratch-gage embodying my improvement. Fig. 2 represents a rear end view. Fig. 3 represents a forward end view. Fig. 4 represents a side view taken at right angles to that shown in Fig. 1. Fig. 5 represents an enlarged longitudinal section taken in the line 5 5 of Fig. 2. Fig. 6 represents an enlarged detail side view of the differential screw.

In the drawings, A represents the hollow bar of the gage, which is provided with the longitudinal slot B and with the stationary guide C, the edge of which opposite to the slot B is cut away and provided with the scratch-spur D, whereby the instrument may be used as an ordinary scratch-gage when a center gage is not desired. The rear end of the bar A is provided with the bushing E, screwed into the end of the said bar, the differential screw F being journaled in the said bushing and provided at its outer end with the milled head G, by means of which the screw is turned. The screw F is provided with a square thread $a$, upon which is cut a V-thread groove $b$ of one-half the pitch of the square thread $a$, and upon the bar A is placed the sliding guide H, which engages with the square thread $a$ of the screw, and upon the screw F and engaging with the finer-thread groove $b$ is placed the nut I, which projects outward from the slot B and is provided with the scratch-spur $c$, and upon turning the screw F the movement imparted to the nut I in either direction will be but one-half of that imparted to the sliding guide H, so that in all cases the scratch-spur $c$ will maintain a median position between the guides C and H. Hence the instrument will form a convenient and desirable center scratch-gage, and when it is desired to hold the sliding guide H firmly in its set position the tightening-screw J may be employed.

I claim as my invention—

In a center scratch-gage, the combination of the stationary guide, and the grooved hollow bar, with the sliding guide, the nut provided with the scratch-spur, and the differential screw having one thread cut upon another and operating the nut and slide, differentially, substantially as described.

RENALDO GUILMETTE.

Witnesses:
  SOCRATES SCHOLFIELD,
  HENRY LA FLAMURE.